(12) United States Patent
Lim et al.

(10) Patent No.: US 12,143,043 B2
(45) Date of Patent: Nov. 12, 2024

(54) INVERTER DRIVING APPARATUS AND METHOD OF CONTROLLING THE SAME

(71) Applicants: Hyundai Motor Company, Seoul (KR); Kia Corporation, Seoul (KR)

(72) Inventors: Young Seul Lim, Seoul (KR); Myung Ho Kim, Incheon (KR); Sang Cheol Shin, Suwon-si (KR); Kang Ho Jeong, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 132 days.

(21) Appl. No.: 17/985,417

(22) Filed: Nov. 11, 2022

(65) Prior Publication Data
US 2023/0412109 A1    Dec. 21, 2023

(30) Foreign Application Priority Data
Jun. 20, 2022   (KR) .......................... 10-2022-0074976

(51) Int. Cl.
H02P 27/08    (2006.01)
H02P 23/00    (2016.01)

(52) U.S. Cl.
CPC ........ H02P 27/085 (2013.01); H02P 23/0027 (2013.01)

(58) Field of Classification Search
CPC ........................... H02P 27/085; H02P 23/0027
See application file for complete search history.

(56) References Cited

U.S. PATENT DOCUMENTS

| | | | |
|---|---|---|---|
| 2011/0241589 A1* | 10/2011 | Danjo | B60L 50/16 318/453 |
| 2014/0001839 A1* | 1/2014 | Kakimoto | H02M 7/53871 307/9.1 |

* cited by examiner

Primary Examiner — Zoheb S Imtiaz
(74) Attorney, Agent, or Firm — Morgan, Lewis & Bockius LLP

(57) ABSTRACT

An inverter driving apparatus includes an inverter including a plurality of legs corresponding to a plurality of phases respectively, a gate driver outputting a pulse width modulation control signal for switching the transistor provided in the leg, a variable resistor circuit connected to a gate end of the transistor, and a switching speed control circuit determining a switching state of the transistor based on the pulse width modulation control signal, adjusting a resistance value of the variable resistor circuit according to the temperature of the transistor based on the determination result, and controlling the switching speed of the transistor.

15 Claims, 7 Drawing Sheets

INVERTER DRIVING APPARATUS AND METHOD OF CONTROLLING THE SAME

CROSS-REFERENCE TO RELATED APPLICATION

The present application claims priority to Korean Patent Application No. 10-2022-0074976, filed Jun. 20, 2022 in the Korean Intellectual Property Office, the entire contents of which is incorporated herein for all purposes by this reference.

TECHNICAL FIELD

The present disclosure relates to an inverter driving apparatus and a method of controlling the inverter driving apparatus for preventing burnout of the inverter and efficiently driving the inverter.

BACKGROUND

An inverter used in an apparatus such as a motor vehicle is a part converting a DC voltage of a high-voltage battery into an AC voltage to drive a motor. To this end, the inverter includes a transistor serving as a switching element, and the transistor included in the inverter may be switched by a gate driver.

On the other hand, when the voltage difference between the two ends of the transistor included in the inverter exceeds a breakdown voltage, burnout of the inverter may follow.

The breakdown voltage is affected by the junction temperature of a transistor and decreases as the junction temperature decreases. That is, the voltage difference between the two ends of the transistor needs to be low in a low junction temperature range to prevent burnout of the inverter.

On the other hand, the maximum value of the voltage difference between the two ends of the transistor increases as the turn-off switching speed at which the transition from a turn-on state into a turn-off state is made increases so that it is necessary to reduce the turn-off switching speed to prevent burnout of the inverter. However, a problem is that the switching energy loss increases as the turn-off switching speed decreases.

The matters described above as a background of the present disclosure are intended only for a better understanding of the background of the present disclosure and are not to be taken as acknowledgment that they pertain to the conventional art already known to those skilled in the art.

SUMMARY

An object of the present disclosure is to provide an inverter driving apparatus and a method of controlling the apparatus configured to determine a gate resistance value for each junction temperature range included in the inverter and control the switching speed according to the determined gate resistance value.

Technical objects to be achieved by the present disclosure are not limited to the technical objects described above, and other technical objects not described will be clearly understood by those skilled in the art to which the present disclosure pertains.

An inverter driving apparatus, as an instrument to resolve the technical issues described above, may include an inverter including a plurality of legs corresponding to a plurality of phases respectively, a gate driver outputting a pulse width modulation control signal for switching the transistor provided in the leg, a variable resistor circuit connected to a gate end of the transistor, and a switching speed control circuit determining a switching state of the transistor based on the pulse width modulation control signal, adjusting the resistance value of the variable resistor circuit according to the transistor temperature based on the determination result, and controlling the switching speed of the transistor.

Further, a method of controlling the inverter driving apparatus, as a means to resolve the technical issues described above, may include is determining the switching state of at least one transistor based on a pulse width modulation control signal for switching the at least one transistor constituting a leg included in the inverter, determining a gate resistance value of the transistor by adjusting a resistance value of a variable resistor circuit connected to the gate end of the transistor according to the temperature of the at least one transistor, and controlling the switching speed of the transistor.

According to the present disclosure, the gate resistance value is determined for each junction temperature range of the transistor included in the inverter, and the switching speed is controlled according to the determined gate resistance value, thereby preventing burnout of the inverter in the low junction temperature range and reducing the switching energy loss in the high junction temperature range.

The effect achievable by the present disclosure is not limited to the effect described above, and the following description will help those skilled in the art to which the present disclosure pertains clearly understand the effects not described.

DETAILED DESCRIPTION

Figure 1:
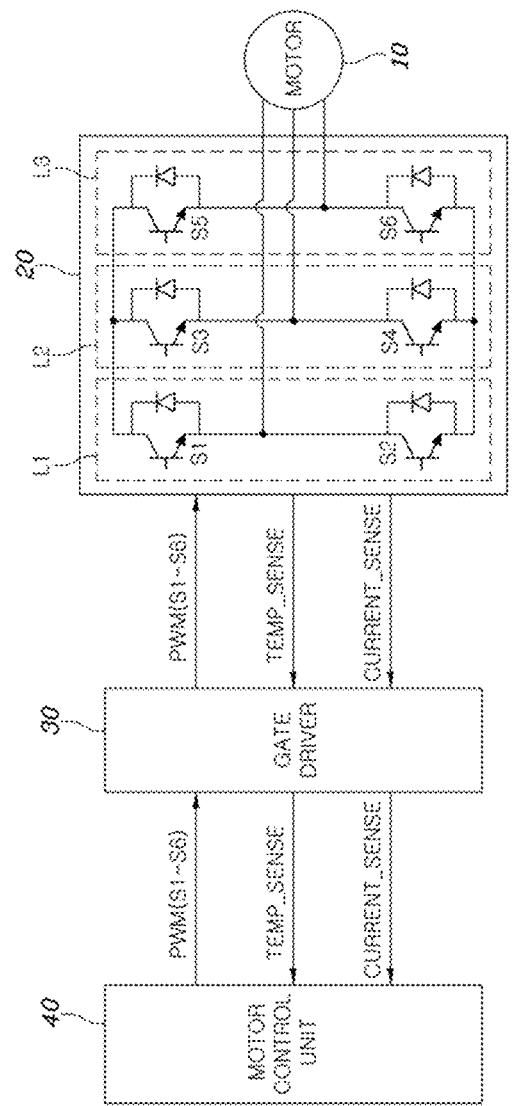
FIG. 1 is a view illustrating an exemplary configuration of a motor driving system according to an embodiment of the present disclosure.

The embodiments disclosed in the present specification will be described in detail with reference to the accompanying drawing in the following. However, the same or similar components will be given the same reference numerals irrespective of the drawing numbers and the repetitive descriptions will be omitted.

When it is determined that the specific description of the known technology in the related art may obscure the gist of the embodiments disclosed in the present specification, the specific description will be omitted. Further, the accompanying drawings are only for a better understanding of is the embodiments disclosed in the present specification. It is to be understood that the technical spirit disclosed in the present specification is not limited by the accompanying drawings and that the present disclosure encompasses all modifications, equivalents, or substitutes included in the spirit and technical scope of the present disclosure.

The terms including ordinal numbers such as first, second, and the like may be used to describe various components, but the components are not to be limited by the terms. The terms may only be used for the purpose of distinguishing one component from the other.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof in advance.

Further, the unit or control unit included in the name such as a motor control unit MCU is a term widely used in naming a controller that controls a specific function of a vehicle and does not refer to a generic function unit.

FIG. 1 is a view illustrating an exemplary configuration of a motor is driving system according to an embodiment of the present disclosure.

FIG. 1 shows that the motor driving system may include a motor 10, an inverter 20, a gate driver 30, and a motor control unit 40.

The motor 10 may have a plurality of windings corresponding to each one of a plurality of phases.

The inverter 20 may include a plurality of legs L1 to L3 corresponding to each one of a plurality of phases, and the first leg L1, the second leg L2, and the third leg L3 may be respectively provided with transistors S1, S2, transistors S3, S4, and transistors S5, S6 serving as switching elements.

The transistors S1 to S6 may be implemented as insulated gate bipolar transistors (IGBT) respectively and may have a collector end and an emitter end through which the current is conducted and a gate end controlling the conduction state of the current.

The gate driver 30 may switch on or off the transistors S1 to S6 included in the inverter 20 by boosting the voltage of the pulse width modulation (PWM) control signal received from the motor control unit 40 and outputting the boosted voltage to the inverter 20. Accordingly, the inverter may drive the motor 10 by converting the direct current of a high-voltage battery (not shown) into the alternating current corresponding to each one of a plurality of phases.

The motor control unit 40 receives the current sensing signal CURRENT_SENSE and the temperature sensing signal TEMP_SENSE output from the inverter 20 through the gate driver 30 to determine the occurrence of an overcurrent, overvoltage, and overheat of the inverter 20. The current sensing signal CURRENT_SENSE may indicate a current of the transistors S1 to S6, and the temperature sensing signal TEMP_SENSE may indicate the junction temperature in the 0 junction region inside the transistors S1 to S6.

On the other hand, when the voltage difference between the collector end and the emitter end (hereinafter referred to as the two ends) of the transistors S1 to S6 exceeds the breakdown voltage of the transistors S1 to S6, the burnout of the inverter 20 may occur. The breakdown voltage may be defined as the threshold voltage at which the reverse current to the PN junction region inside the transistors S1 to S6 rapidly increases. The breakdown voltage varies according to the junction temperature of the transistors S1 to S6, which will be described with reference to FIG. 2.

Figure 2:
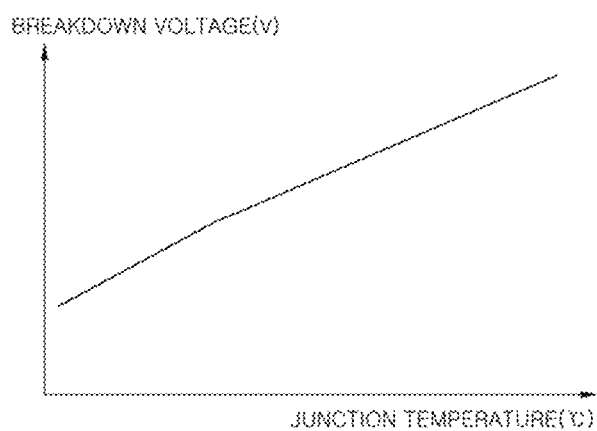
FIG. 2 is a graph illustrating a relationship between a breakdown voltage of a transistor and a junction temperature.

FIG. 2 is a view illustrating a relationship between the breakdown voltage and the junction temperature of the transistors S1 to S6 included in the inverter 200.

FIG. 2 shows that the breakdown voltage of the transistors S1 to S6 included in the inverter 20 linearly changes with respect to the junction temperature of the transistors S1 to S6, and is lowered in a low junction temperature range (low-temperature range) relative to a high junction is temperature range (room temperature and high-temperature range).

Since the breakdown voltage is lowered in the low junction temperature range, the voltage difference between the two ends of the transistors S1 to S6 needs to be low to prevent burnout of the inverter 20 when the junction temperature is low.

Further, since the maximum value of the voltage difference between the two ends of the transistors S1 to S6 increases as the turn-off switching speed at which the transistor transitions from a turn-on state to turn-off state increases, it is necessary to lower the turn-off switching speed in the low junction temperature range.

By the way, since the breakdown voltage increases in the high junction temperature range, lowering the turn-off switching speed even in the high junction temperature range as in the low junction temperature range may cause unwanted switching energy loss.

On the other hand, since the turn-off switching speed changes according to the gate resistance value of the transistors S1 to S6, the turn-off switching speed may be controlled by the gate resistance value of the transistors S1 to S6.

Accordingly, an embodiment of the present disclosure discloses an inverter driving apparatus configured to prevent burnout of the inverter 20 in the low junction temperature range and reduce the unwanted switching is energy loss in the high junction temperature range by determining the gate resistance value of the transistors S1 to S6 in each junction temperature range and controlling the turn-off switching speed according to the determined gate resistance value.

Figure 3:
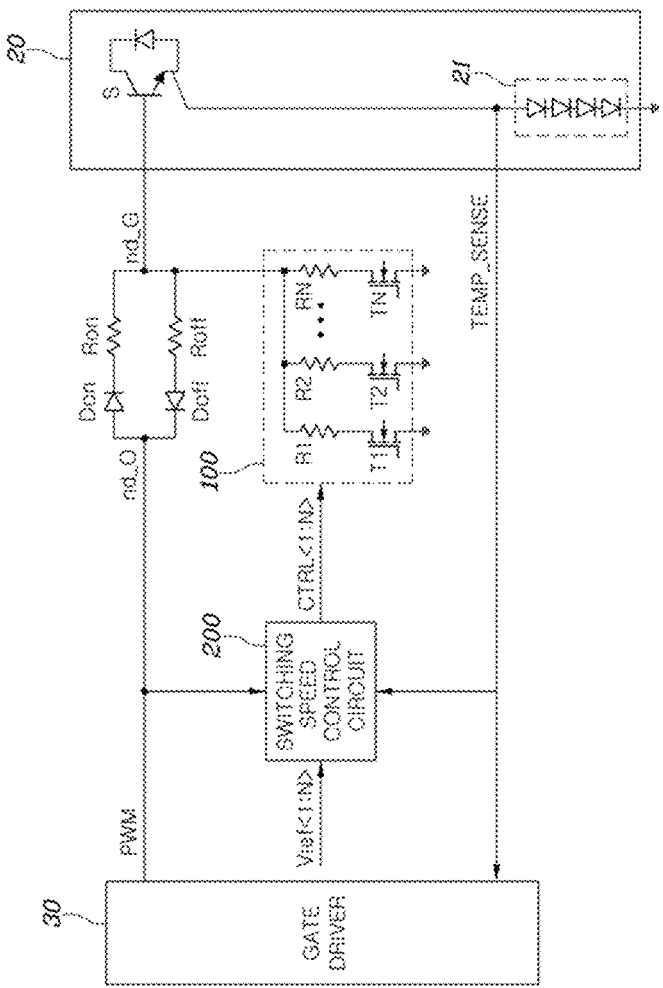
FIG. 3 is a view illustrating an exemplary configuration of an inverter driving system according to an embodiment of the present disclosure.

FIG. 3 is a view illustrating an exemplary configuration of an inverter driving apparatus according to the embodiment of the present disclosure.

FIG. 3 shows that the inverter driving apparatus may include the inverter 20, the gate driver 30, a variable resistor circuit 100, and a switching speed control circuit 200.

The inverter 20 may include a temperature sensor 21 sensing the transistor S and the junction temperature of the transistor S. The transistor S represents one of the transistors (S1 to S6 in FIG. 1) included in the inverter 20.

The temperature sensor 21 may be connected to a ground terminal and one end of the transistor S and output a temperature sensing signal TEMP_SENSE, the voltage level of which varies according to the junction temperature. According to the present embodiment, the temperature sensor 21 is implemented as a diode temperature sensor of which the voltage at either end varies according to the junction temperature of the transistor S but may be variously implemented as a negative temperature coefficient (NTC) thermistor whose resistance value varies according to temperature and the is like.

The two gate resistors Ron, Roff may be connected in parallel between a gate node nd_G to which the gate end of the transistor S is connected and an output end node nd_O of the gate driver 30 outputting the PWM control signal. The value of the gate-on resistor Ron may be set in consideration of an overcurrent of the transistor in a turn-on state, and the value of the gate-off resistor Roff may be set in consideration of an overcurrent of the transistor S in a turn-off state.

A diode Don may be connected to the gate-on resistor Ron and the output end node nd_O and serve as a rectifier so that the current of the output end node nd_O flows to the gate node nd_G through the gate-on resistor Ron. A diode Doff may be connected to the gate-off resistor Roff and the output end node nd_O and serve as a rectifier so that the current of the gate node nd_G flows to the output end node nd_O through the gate-off resistor Roff.

The variable resistor circuit 100 may include resistors R1 to RN and switch elements T1 to TN. ('N' is a natural number.) The resistors R1 to RN may be connected in parallel between the gate node nd_G and the ground terminals respectively. Further, when the gate-off resistor Roff is electrically connected to the ground terminal of the gate driver 30, the resistors R1 to RN may be connected in parallel with the gate-off resistor Roff between the fate node nd_G and the ground terminals.

One end of each one of the switch elements T1 to TN may be connected to one end of each one of the resistors R1 to RN, and the other end of each one of the switch elements T1 to TN may be connected to the ground terminal. According to the embodiment, the other end of each one of the switch elements T1 to TN may be connected to the gate node nd_G.

The switching speed control circuit 200 may adjust the resistance value of the variable resistor circuit 100 according to the switching state and the junction temperature of the transistor S based on the PWM control signal, the temperature sensing signal TEMP_SENSE, and the reference voltages Vref<1:N>, determine the gate resistance value of the transistor S, and control the switching speed according to the determined gate resistance value. Each of the reference voltages Vref<1:N> may have levels different from each other. The switching speed may increase as the gate resistance value of the transistor S decreases.

First, the switching speed control circuit 200 may compare the voltage level of the temperature sensing signal TEMP_SENSE with the level of the reference voltages Vref<1:N> and determine the junction temperature range of the transistor S. For example, when the voltage level of the temperature sensing signal TEMP_SENSE is higher than the level of a first reference voltage Vref<1>, the switching speed control circuit 200 may determine that the junction temperature range of the transistor S corresponds to a first temperature range. In contrast, when the voltage level of the temperature sensing signal TEMP_SENSE is between the first reference voltage Vref<1> and a second reference voltage Vref<2>, the switching speed control circuit may determine that the junction temperature range of the transistor S corresponds to a second temperature range higher than the first temperature range.

Further, the switching speed control circuit 200 may determine the switching state of the transistor S according to the logic level of the PWM control signal. For example, the switching speed control circuit 200 may determine the switching state of the transistor S to be a turn-on state when the logic level of the PWM control signal corresponds to a first logic level (for example, logic high level) and determine the switching state of the transistor S to be a turn-off state when the logic level of the PWM control signal corresponds to a second logic level (for example, logic low level).

The switching speed control circuit 200 may adjust the resistance value of the variable resistor circuit 100 by turning on or off each switch element T1 to TN included in the variable resistor circuit 100 for each junction temperature range of the transistor S when the switching state of the transistor S is determined to be the turn-off state.

For example, when the junction temperature range of the transistor S corresponds to the first temperature range, the switching speed control is circuit 200 may deactivate all the resistance control signals CTRL<1:N> to turn off all the switch elements T1 to TN. Accordingly, the resistors R1 to RN included in the variable resistor circuit 100 may be electrically separated from all the ground terminals, and the gate resistance value Roff' of the transistor S may be set to the Roff value in the turn-off state.

In contrast, when the junction temperature range of the transistor S corresponds to the second temperature range higher than the first temperature range, the switching speed control circuit 200 may activate a first resistance control signal CTRL<1> among the resistance control signals CTRL<1:N> to turn on the first switch element T1. Accordingly, the first resistor R1 among the resistors R1 to RN may be electrically connected to the ground terminal and the gate resistance value Roff' of the transistor S may be set to Roff//R1 in the turn-off state.

That is, when the switching state of the transistor S is determined to be the turn-off state, the switching speed control circuit 200 may increase the turn-off switching speed of the transistor S by decreasing the gate resistance valve Roff' as the junction temperature range increases. Accordingly, the switching speed control circuit 200 may prevent burnout of the inverter 20 in the low junction temperature range and reduce the switching energy loss in the high junction temperature range.

On the other hand, when it is determined that the switching state of is the transistor S is the turn-on state, the switching speed control circuit 200 may deactivate all the resistance control signals CTRL<1:N to turn off all the switch elements T1 to TN. Accordingly, all the resistors R1 to RN included in the variable resistor circuit 10 are electrically separated from the ground terminal and the gate resistance value Ron of the transistor S may be set to the Ron value in the turn-on state.

More specific configuration and operation method of the switching speed control circuit 200 will be described with reference to FIG. 5.

Figure 4:
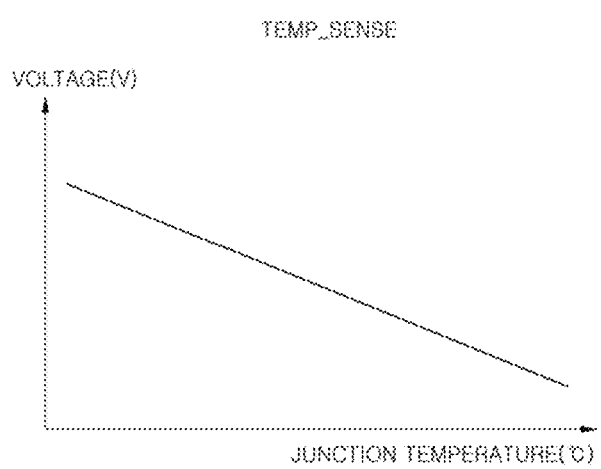
FIG. 4 is a graph illustrating a relationship between the junction temperature of the transistor illustrated in FIG. 3 and a voltage level of a temperature sensing signal.

FIG. 4 is a graph illustrating a relationship between the junction temperature of a transistor A illustrated in FIG. 3 and a voltage level of a temperature sensing signal TEMP_SENSE.

FIG. 4 shows that the voltage level of the temperature sensing signal TEMP_SENSE linearly changes with respect to the junction temperature of the transistor and decreases as the junction temperature increases. However, it will be obvious to those skilled in the art that the voltage level of the temperature sensing signal TEMP_SENSE may increase as the junction temperature of the transistor S increases unlike FIG. 4.

Figure 5:
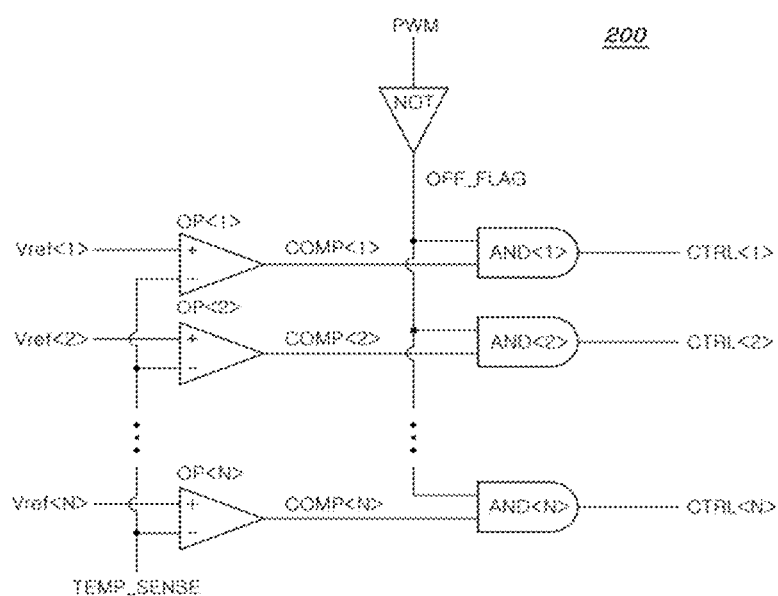
FIG. 5 is a circuit diagram according to an embodiment of the switching speed control circuit illustrated in FIG. 3.

FIG. 5 is a circuit diagram according to an embodiment of the switching speed control circuit 200 illustrated in FIG. 3.

FIG. 5 shows that the switching speed control circuit 200 may include comparators OP<1:N>, a NOT gate, and product gates AND<1: N>.

The comparators OP<1: N> may compare the voltage level of the temperature sensing signal TEMP_SENSE with the level of reference voltages Vref<1:N and output comparison result signals COMP<1:N>. For example, a first comparator OP<1> may deactivate a first comparison result signal COMP<1> to a logic low level when the voltage level of the temperature sensing signal TEMP_SENSE is higher than the level of the first reference voltage Vref<1> and activate the first comparison result COMP<1> to a logic high level when the voltage level of the temperature sensing signal TEMP_SENSE is lower than the level of the first reference voltage Vref<1>.

The NOT gate may inversely buffer the PWM control signal and output a turn-off flag signal OFF_FLAG. For example, if the transistor S is turned off when the PWM control signal has the logic low level, the turn-off flag signal OFF_FLAG may be activated to the logic high level when the transistor S is turned off.

The product gates AND<1:N> may perform the logic product calculation on the comparison result signals COMP<1:N> and the turn-off flag signal OFF_FLAG and output the resistance control signals CTRL<1:N>. For example, the first product gate AND<1> may turn on the first switch element T1 by activating the first resistance control signal CTRL<1> to the logic high level when both the first comparison result signal COMP<1>, and the turn-off flag signal OFF_FLAG are activated to the logic high level.

Figure 6:
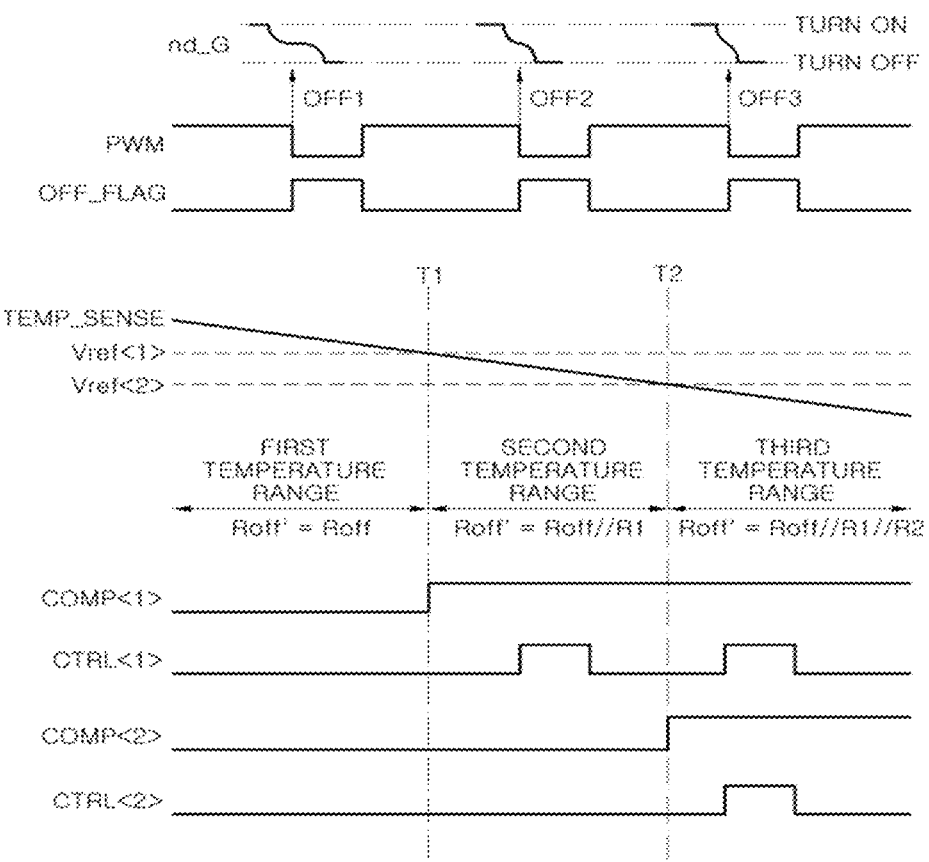
FIG. 6 is a timing diagram illustrating a control method of the inverter driving apparatus illustrated in FIG. 3.

FIG. 6 is a timing diagram illustrating a control method of an inverter driving apparatus illustrated in FIG. 3.

FIG. 6 shows that the transistor S is turned on when the PWM control signal has the logic high level and is turned off when the PWM control signal has the logic low level.

Since the voltage level of the temperature sensing signal TEMP_SENSE is higher than the first reference voltage Vref<1> before T1, the switching speed control circuit 200 may determine the junction temperature range of the transistor S to be the first temperature range and deactivate the comparison result signals COMP<1:N> to the logic low level. In this case, the resistance control signals CTRL<1:N> may be deactivated to the logic low level, all the switch elements T1 to TN may be turned off, and all the resistors R1 to RN of the variable resistor circuit 100 may be electrically separated from the ground terminal. Accordingly, the gate resistance value Roff of the transistor S may be set to the Roff value in the turn-off state.

When the PWM control signal transitions from the logic high level to the logic low level (OFF1), the current of the gate node nd_G flows to the output end node nd_O, and the switching state of the transistor S transitions from the turn-on state to the turn-off state.

When the voltage level of the temperature sensing signal TEMP_SENSE is between the level of the first reference voltage Vref<1> and is the level of the second reference voltage Vref<2> at T1, the switching speed control circuit 200 may determine the junction temperature range of the transistor S to be the second temperature range higher than the first temperature range and activate the first comparison result signal COMP<1> to the logic high level.

When the PWM control signal transitions from the logic high level to the logic low level (OFF2), the turn-off flag signal OFF_FLAG may have the logic high level. In this case, the first resistance control signal CTRL<1> may be activated to the logic high level, the first switch element T1 among the switch elements T1 to TN may be turned on, and the first resistor R1 may be electrically connected to the ground terminal. In this case, the gate resistance value Roff of the transistor S is set to Roff//R1 in the turn-off state, and the turn-off switching speed of 'OFF2' is higher than the turn-off switching speed of 'OFF1'.

When the voltage level of the temperature sensing signal TEMP_SENSE is between the level of the second reference voltage Vref<2> and the level of a third reference voltage Vref<3> at T2, the switching speed control circuit 200 may determine the junction temperature range of the transistor S to be the third temperature range higher than the second temperature range and activate the second comparison result signal COMP<2> to the logic high level.

When the PWM control signal transitions from the logic high level to the logic low level (OFF3), the first and second resistance control signals CTRL<1:2> may be activated to the logic high level, the first and second switch elements T1, T2 may be turned on, and the first and second resistors R1, R2 may be electrically connected to the ground terminal. Accordingly, the gate resistance value Roff of the transistor S is set to Roff//R1//R2 in the turn-off state, and the turn-off switching speed of 'OFF3' is higher than the turn-off switching speed of 'OFF2'.

Figure 7:
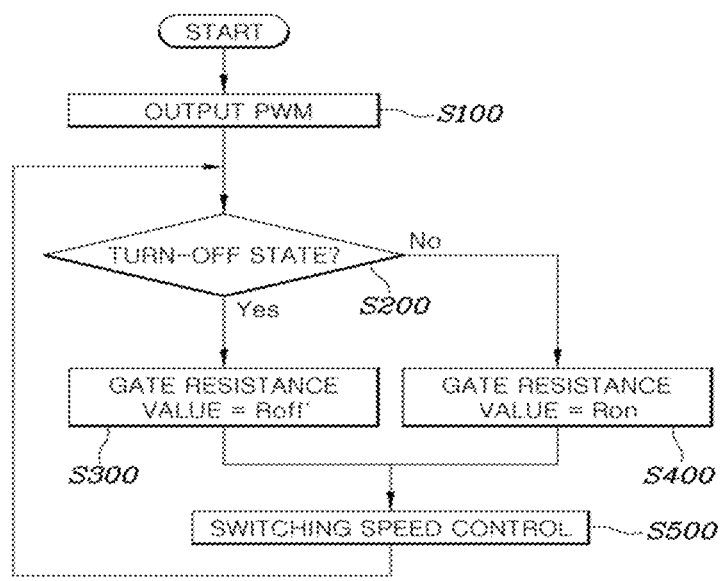
FIG. 7 is a flowchart of a control method of an inverter driving apparatus according to an embodiment of the present disclosure.

FIG. 7 is a flowchart of a control method of an inverter driving apparatus according to an embodiment of the present disclosure.

FIG. 7 shows that the gate driver 30 may output the PWM control signal for switching the transistor S to the inverter 20 (S100) and the switching speed control circuit 200 may determine whether the switching state of the transistor S is the turn-off state based on the PWM control signal (S200).

When the switching state of the transistor is determined to be the turn-off state (YES in S200), the switching speed control circuit 200 may determine the gate resistance value Roff of the transistor in the turn-off state by adjusting the resistance value of the variable resistor circuit 100 connected to the gate end of the transistor according to the junction temperature of the transistor S. As described above, the gate resistance value Roff may decrease is as the junction temperature range increases in the turn-off state.

If the switching state of the transistor S is determined to be the turn-on state (NO in S200), the switching speed control circuit 200 may set the gate resistance value of the transistor S to the Ron value (S400).

Then, the switching speed of the transistor S may be controlled based on the gate resistance value determined in S300 or S400 (S500). As described above, the switching speed of the transistor S may increase as the determined gate resistance value decreases. Then, S200 may be repeated.

As described above, the inverter driving apparatus according to the present embodiment may determine the gate resistance value of the transistor for each junction temperature range and control the turn-off switching speed, thereby preventing burnout of the inverter in the low junction temperature range.

What is claimed is:

1. An inverter driving apparatus comprising:
   an inverter including a plurality of legs corresponding to a plurality of phases respectively;
   a gate driver outputting a pulse width modulation signal for switching a transistor provided in at least one leg of the plurality of legs;
   a variable resistor circuit connected to a gate terminal of the transistor;
   a switching speed control circuit determining a switching state of the transistor based on the pulse width modulation control signal, adjusting a resistance value of the variable resistor circuit according to a transistor temperature based on the determination result, and controlling a switching speed of the transistor; and
   a gate-off resistor connected between an output end node of the gate driver outputting the pulse width modulation control signal and a gate node connected to a gate end of the transistor.

2. The apparatus of claim 1, wherein the switching speed control circuit adjusts the resistance value of the variable resistor circuit for each temperature range of the transistor when the switching state of the transistor is determined to be a turn-off state.

3. The apparatus of claim 1, wherein the switching speed control circuit compares a voltage level of a temperature sensing signal changing according to the transistor temperature to determine a temperature range of the transistor.

4. The apparatus of claim 3, wherein the inverter further includes a temperature sensor sensing the temperature of the transistor to output the temperature sensing signal.

5. The apparatus of claim 1, wherein the switching speed control circuit adjusts the resistance value of the variable resistor circuit for each temperature range of the transistor based on the determination result to determine a gate resistance value of the transistor.

6. The apparatus of claim 5, wherein the switching speed control circuit decreases the gate resistance value of the transistor based on the determination result as the temperature range of the transistor increases.

7. The apparatus of claim 6, wherein the switching speed increases as the gate resistance value of the transistor decreases.

8. The apparatus of claim 1, further comprising:
a diode connected between the gate-off resistor and the output end node.

9. The apparatus of claim 8, wherein
the variable resistor circuit includes:
a first resistor connected in parallel with the gate-off resistor between the gate node and a ground terminal; and
a first switch element connected to the first resistor, and
the switching speed control circuit compares a voltage level of a temperature sensing signal regarding the transistor temperature with a level of a first reference voltage to turn on the first switch element when the switching state of the transistor is determined to be a turn-off state.

10. The apparatus of claim 9, further comprising:
a gate-on resistor connected in parallel with the gate-off resistor between the output end node and the gate node, wherein
the switching speed control circuit turns off the first switch element when the switching state of the transistor is determined to be a turn-on state.

11. The apparatus of claim 9, wherein
the variable resistor circuit further includes:
a second resistor connected in parallel with the first resistor between the gate node and the ground terminal; and
a second switch element connected to the second resistor,
the switching speed control circuit compares the voltage level of the temperature sensing signal with a level of a second reference voltage to turn on the second switch element when the switching state of the transistor is determined to be a turn-off state, and
the second reference voltage and the first reference voltage have different levels.

12. A method of controlling an inverter driving apparatus, the method comprising:
determining a switching state of at least one transistor based on a pulse width modulation control signal for switching the at least one transistor constituting a leg included in the inverter;
determining a gate resistance value of the transistor by adjusting a resistance value of a variable resistor circuit connected to a gate end of the transistor according to the temperature of the at least one transistor based on the determination result; and
controlling the switching speed of the transistor based on the determined resistance value, and
wherein the determining comprises determining the gate resistance value of the transistor, based on the resistance value of the variable resistor circuit and a gate-off resistor connected between an output end node of a gate driver outputting the pulse width modulation control signal and a gate node connected to a gate end of the transistor.

13. The method of claim 12, where the determining the switching state of at least one transistor is executed when the switching state of the transistor is determined to be a turn-off state.

14. The method of claim 12, wherein the determining the gate resistance value of the transistor is executed such that the gate resistance value of the transistor decreases in a turn-off state as the temperature range of the transistor increases.

15. The method of claim 12, further comprising:
setting the gate resistance value to a gate-on resistance value.

* * * * *